US012576584B2

(12) United States Patent
Glasschröder et al.

(10) Patent No.: US 12,576,584 B2
(45) Date of Patent: Mar. 17, 2026

(54) DEVICE FOR ADDITIVE MANUFACTURING OF A COMPONENT

(71) Applicant: GROB-WERKE GmbH & Co. KG, Mindelheim (DE)

(72) Inventors: Johannes Glasschröder, Neusäß (DE); Oliver Leusch, Augsburg (DE); Christian Miklec, Bad Wörishofen (DE); Benjamin Himmel, Gröbenzell (DE); Andreas Lang, Ettringen (DE); Steffen Kirchner, Igling (DE); Martin Otter, Memmingen (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 328 days.

(21) Appl. No.: 18/565,317

(22) PCT Filed: Mar. 9, 2022

(86) PCT No.: PCT/EP2022/056029
§ 371 (c)(1),
(2) Date: Nov. 29, 2023

(87) PCT Pub. No.: WO2023/280445
PCT Pub. Date: Jan. 12, 2023

(65) Prior Publication Data
US 2024/0253306 A1 Aug. 1, 2024

(30) Foreign Application Priority Data

Jul. 5, 2021 (DE) ..................... 10 2021 117 285.3

(51) Int. Cl.
*B29C 64/209* (2017.01)
*B29C 64/106* (2017.01)
(Continued)

(52) U.S. Cl.
CPC .......... *B29C 64/209* (2017.08); *B29C 64/106* (2017.08); *B29C 64/236* (2017.08);
(Continued)

(58) Field of Classification Search
CPC .......... B22F 10/14; B22F 10/16; B22F 12/53; B29C 64/209; B29C 64/106; B29C 64/112
See application file for complete search history.

(56) References Cited

U.S. PATENT DOCUMENTS 3,675,709 A 7/1972 Vogerl et al.
7,029,624 B2 4/2006 Orme-Marmerelis et al.
(Continued)

FOREIGN PATENT DOCUMENTS

CN 101397996 A 4/2009
CN 110481025 A 11/2019
(Continued)

OTHER PUBLICATIONS

English translation of the Written Opinion of the International Searching Authority in parent application No. PCT/EP2022/056029.
(Continued)

*Primary Examiner* — Yung-Sheng M Tsui
(74) *Attorney, Agent, or Firm* — J-TEK LAW PLLC; Jeffrey D. Tekanic; Scott T. Wakeman

(57) ABSTRACT

An apparatus (100) for additive manufacturing of a component facilitates an exchange of components that are subject to wear and/or of components that facilitate usage of different materials in an additive manufacturing process. For this purpose, the apparatus includes a magazine (112) that has multiple nozzles (110) and facilitates an automated exchange of one nozzle with another during a manufacturing process. By using suitable actuators, either only the nozzle
(Continued)

(110) can thus be exchanged, or the reservoir (108) containing the liquid material having the nozzle (110) attached to it can be replaced. When changing the reservoir (108), a piston (130) received therein can be exchanged at the same time.

19 Claims, 5 Drawing Sheets

(51) Int. Cl.
| | |
|---|---|
| *B29C 64/236* | (2017.01) |
| *B29C 64/241* | (2017.01) |
| *B29C 64/393* | (2017.01) |
| *B33Y 30/00* | (2015.01) |
| *B33Y 50/02* | (2015.01) |

(52) U.S. Cl.
CPC .......... *B29C 64/241* (2017.08); *B29C 64/393* (2017.08); *B33Y 30/00* (2014.12); *B33Y 50/02* (2014.12)

(56) References Cited

U.S. PATENT DOCUMENTS

| | | | | |
|---|---|---|---|---|
| 8,287,959 | B2 * | 10/2012 | Batchelder | B29C 64/106 |
| | | | | 427/256 |
| 8,523,331 | B2 | 9/2013 | Houben | |
| 9,073,366 | B1 * | 7/2015 | Din | B41J 11/04 |
| 9,307,625 | B2 | 4/2016 | Rollinger et al. | |
| 10,040,249 | B2 | 8/2018 | Kraibühler et al. | |
| 2005/0145363 | A1 | 7/2005 | Tseng | |
| 2009/0087330 | A1 | 4/2009 | Hunt et al. | |
| 2014/0218428 | A1 | 8/2014 | Araki et al. | |
| 2016/0001305 | A1 | 1/2016 | Doak et al. | |
| 2017/0305146 | A1 | 10/2017 | Mihailovic et al. | |
| 2018/0319159 | A1 | 11/2018 | Klerken et al. | |
| 2019/0329503 | A1 | 10/2019 | Singov | |
| 2020/0307180 | A1 | 10/2020 | Khalate et al. | |
| 2021/0129433 | A1 * | 5/2021 | Gilan | B33Y 30/00 |
| 2021/0379664 | A1 | 12/2021 | Gibson et al. | |
| 2022/0023938 | A1 | 1/2022 | Friedrich et al. | |

FOREIGN PATENT DOCUMENTS

| | | | |
|---|---|---|---|
| CN | 111168994 | A | 5/2020 |
| DE | 102017215841 | A1 | 3/2019 |
| DE | 102018221752 | A1 | 6/2020 |
| DE | 102018221758 | A1 | 6/2020 |
| DE | 102019219867 | A1 | 6/2021 |
| EP | 2777818 | A1 | 9/2014 |
| JP | 2011173125 | A | 9/2011 |
| KR | 102088676 | B1 | 3/2020 |
| WO | 2017125380 | A1 | 7/2017 |
| WO | 2019115259 | A1 | 6/2019 |
| WO | 2020061544 | A1 | 3/2020 |
| WO | 2020120317 | A1 | 6/2020 |
| WO | 2020120568 | A1 | 6/2020 |

OTHER PUBLICATIONS

English translation of the International Search Report dated Jun. 13, 2023 for parent application No. PCT/EP2022/056029.
Office Action and Search Report from the Chinese Patent Office dispatched Jan. 21, 2026, in counterpart CN application No. 202280034956.6, and translation thereof.

* cited by examiner

DEVICE FOR ADDITIVE MANUFACTURING OF A COMPONENT

CROSS-REFERENCE

This application is the US national stage of International Patent Application No. PCT/EP2022/056029 filed on Mar. 9, 2022, which claims priority to German Patent Application No. 10 2021 117 285.3 filed on Jul. 5, 2021.

TECHNICAL FIELD

The present disclosure relates to a device for additive manufacturing of a component, in particular by dropwise application of a liquid material using a printhead.

BACKGROUND ART

Additive manufacturing processes are characterized by a high degree of design freedom and by tool-free production. They are therefore particularly suited for individual parts and components having a high degree of complexity that cannot be manufactured using conventional manufacturing processes, or that can be manufactured only at great expense. In these additive manufacturing processes, the workpieces are built up in layers or in elements based on digital models.

A typical process for the building up of metallic components is the so-called "Material Jetting" (MJT) process, in which a printhead prints molten material directly onto a build platform through one or more individually controlled nozzles.

In the above-mentioned additive manufacturing process, which is also known as "Liquid Metal Printing" (LMP), a nozzle is often used for the generation of droplets from a liquid melt, in which the nozzle opening is an integral part of the printhead. In a device shown in WO 2020/120568 A1, a special nozzle plate is inserted into the printhead and is fastened to the crucible (that contains the melt) in a friction-fit manner by a clamping nut.

SUMMARY

It is one non-limiting object of the present teachings to disclose techniques for improving known printing systems, in particular with regard to increasing efficiency in the manufacture of components from molten material.

In one aspect of the present teachings, a device for additive manufacturing of a component may include a printhead configured to apply a liquid material, e.g., to a build platform in order to build up (3-D print) a component. The printhead includes a base. A controller is configured to control the printhead to apply the liquid material. A magazine has multiple nozzles, which are each detachably fastenable to the printhead in a first mounting position relative to the base. At least one actuator is configured to be controlled by the controller to move the printhead and/or the magazine relative to each other so that one of the multiple nozzles is moved to the first mounting position.

A nozzle of a printhead is typically subject to wear. Therefore, if this component fails during manufacturing, it usually leads to a process stoppage, especially if inline cleaning of the nozzle will not be performed. Following such a process stoppage, either the nozzle plate or other parts of the printhead having the nozzle plate must then be exchanged. This can be made possible, for example, by providing a clamping nut that connects a nozzle plate with the crucible in a friction-fit and detachable manner.

For manufacturing reasons, the nozzle clamping nut is preferably made of a metallic material. On the other hand, most of the other components of a typically used printhead are preferably made of engineered ceramics, which have a low thermal expansion coefficient. Because such ceramics do no deform and the crucible contains a fluid, challenges thus result with respect to the sealing, for example, of the nozzle plate with respect to the crucible or with respect to a guide sleeve provided in the crucible, in order to prevent leakage of the liquid melt. Therefore, an effective seal is particularly important because the crucible is subjected to an overpressure during start-up and during the manufacturing process, because the overpressure promotes the droplet generation. Therefore, according to this aspect of the present teachings, an elastic portion of a component is provided so that a sufficient fastening force of, for example, the clamping nut to the ceramic guide sleeve can be obtained. Furthermore, it is advantageous if the metallic material of the component has substantially the same coefficient of thermal expansion as the ceramic component. In the present invention, it has been recognized in particular that a plastic deformation of a heat-resistant sealing ring can prevent leakage of the melt at the nozzle plate.

The nozzle plate itself is a core element for the droplet generation and places high demands on the material used. A further challenge arises from the aforementioned process-related wear of the nozzle plate. In particular, for process times of several days, this necessitates an inline cleaning or multiple changes of the nozzle plate during the printing process, in order to ensure consistent droplet quality. It has thus been found that an inline cleaning in particular cannot eliminate adhesions in the nozzle bore, such as occurs in the processing of magnesium-containing alloys. Furthermore, the nozzle hole can become contaminated due to a mechanical impact on the nozzle, or it can lead to damage of the nozzle and of the separation edge for the droplets. Therefore, to reduce process downtime, the nozzle plate should be changed during the process, i.e., when it is still in a hot condition. Techniques according to this aspect of the present teachings make it possible to change the nozzle plate during a printing process, in particular even when the crucible is filled and heated.

A further recognition, which underlies the present teachings, is that, in addition to the aforementioned way for exchanging the nozzle plate during the manufacturing process, it can also be necessary to change the crucible during the buildup process. For example, a crucible change is necessary if reproducible droplet quality can not obtained despite the installation of a new nozzle, which can be due to, for example, impurities in the piston guide or to a too large amount of slag in the crucible. Furthermore, in the LMP process it may be desirable to process (apply, print) different materials during a buildup (3-D printing) process. In order to avoid the parallel use of two separate printheads and to keep the crucibles single-origin, a separate crucible should be utilized for each material or each alloy. In addition, the application rate and thus the cost-effectiveness or the degree of detail of the components can be increased if different printheads having different diameters of the nozzle bore are used. Thus, a smaller diameter can be used for a higher level of detail, whereas a larger diameter can be used to increase the application rate.

It is therefore advantageous if a separate crucible is utilized for each material or for each alloy. However, this requires an exchange of the crucible and, if necessary, the actuator during the ongoing process. According to this aspect of the present teachings, a crucible changer is provided for this purpose, with which the crucibles having a nozzle plate and, if necessary, also the actuator can be exchanged during the ongoing process.

The nozzle plate described herein makes possible a reliable seal with respect to the ceramic components of the printhead, and thus prevents leakage of the melt from the crucible despite the overpressure conditions in the crucible.

Furthermore, the exchange of the nozzle plate according to the present teachings leads to a reduction in the crucible costs, a reduction of the cleaning expense by using the exchangeable nozzle plates and a way of easily and quickly changing the diameter of the nozzle bore during a process. In addition, the droplet quality can be increased by appropriately exchanging the nozzle plate.

Furthermore, the present teachings provide a way to perform a crucible change during the printing process and, if necessary, to remove the piston in a simple and automatable way.

BRIEF DESCRIPTION OF THE DRAWINGS

Embodiments and further developments of the invention will be described below with reference to the figures.

DETAILED DESCRIPTION

Figure 1:
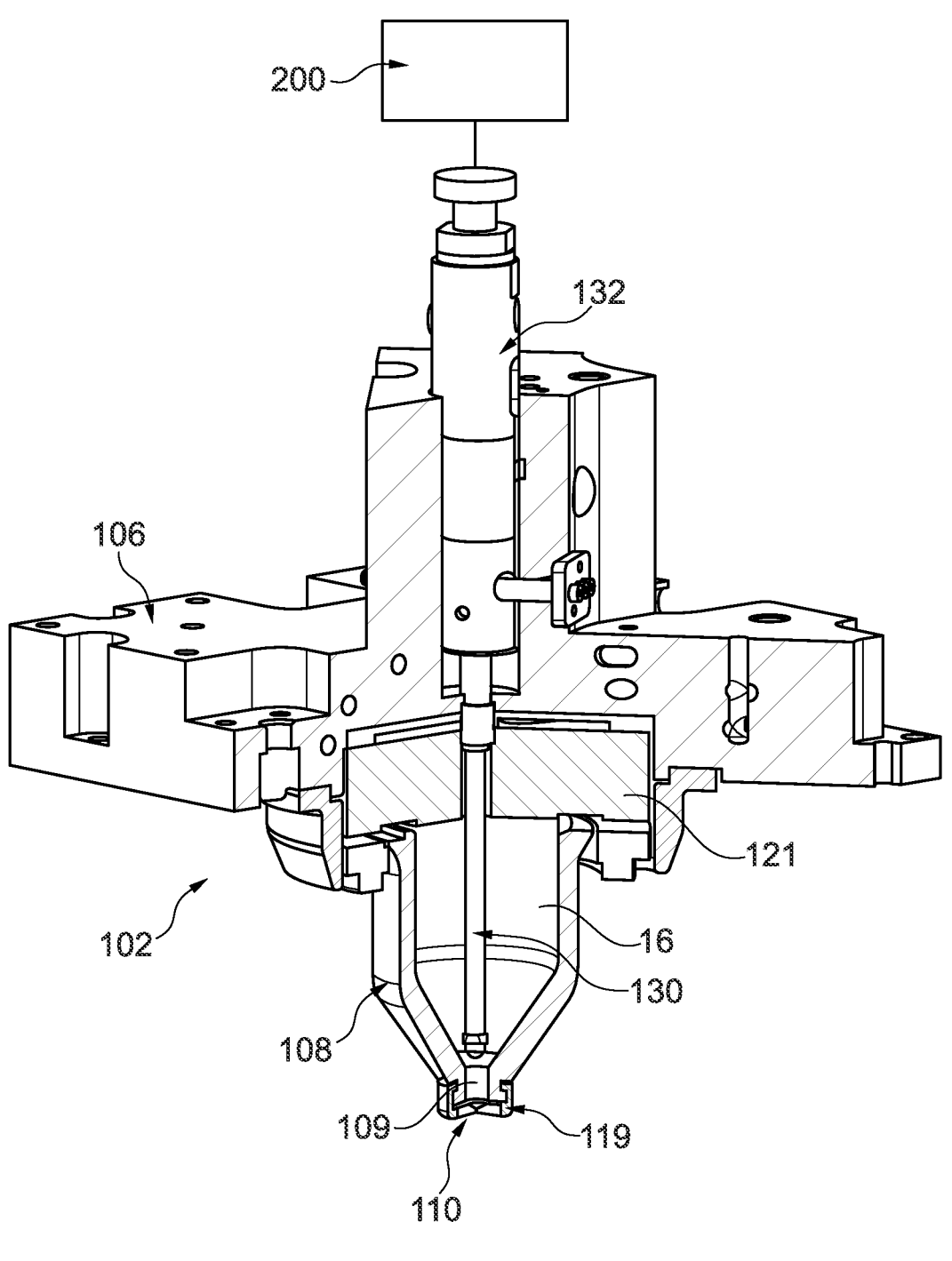
FIG. 1 shows a partially-sectioned, perspective view of a printhead according to the present disclosure.

FIG. 1 shows an exemplary printhead 102 of a device 100 (see FIG. 4) for additive manufacturing of a component. The printhead 102 includes a base 106, to which is fastened a reservoir 108 that contains a liquid melt of a material 16. Herein, the term "base" should be broadly construed and denotes, in essence, the portion of the printhead, to which the particular reservoir 108 is attached. In particular, for a person skilled in the art it will be understood that normally an actuator 132, which moves the piston 130 that is also attached to the base 106, is provided in the base 106 so that the piston 130 ejects liquid material 16 from an outlet opening 109 provided in the reservoir 108. A controller 200 is provided to control the actuator 132. The controller 200 is configured to control the printhead 102 (in particular the actuator 132) to apply the liquid material 16 in a known manner.

For example, the piston 130 can be moved axially by an actuator 132 in the form of a piezoactuator, and thereby displace (eject) liquid melt from the outlet opening 109 in the form of droplets. It is understood therefrom that a guide sleeve (not shown), which guides the piston 130, can be provided in the outlet opening 109 in some embodiments.

A nozzle 110 is attached to the reservoir 108 at the lower end of the outlet opening 109. As will be explained in more detail below, for example, the component having the nozzle 110 (e.g., a nozzle plate or the like) can be fastened to the reservoir 108 by a fastening element 119, such as a clamping nut.

Figure 2:
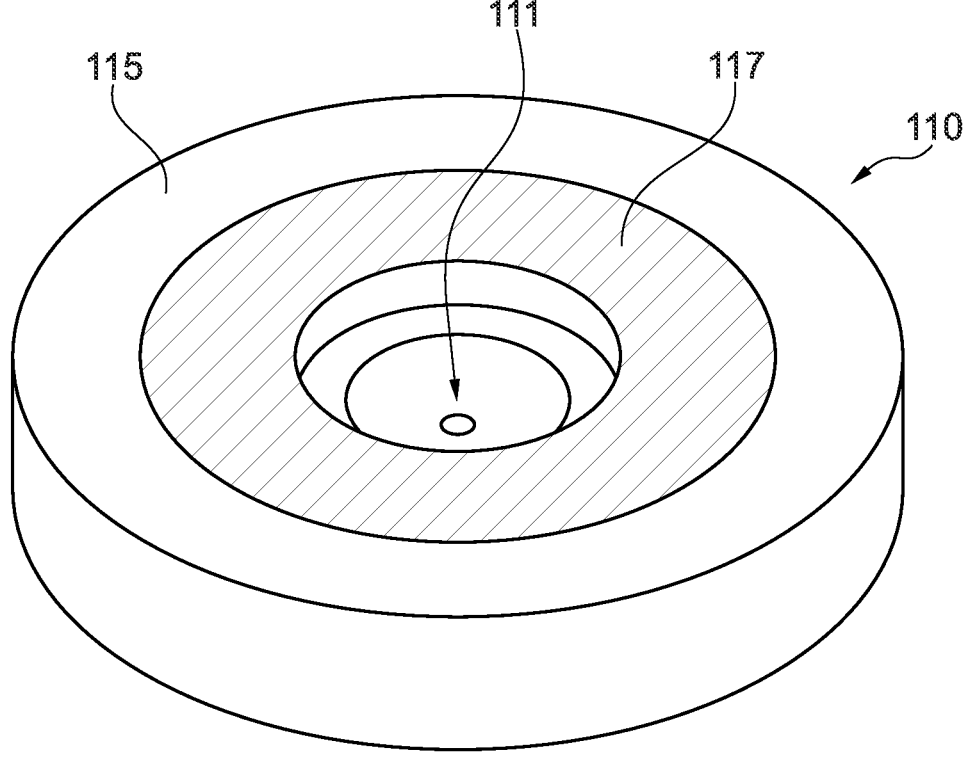
FIG. 2 shows a perspective view of an exemplary nozzle for the printhead shown in FIG. 1.

FIG. 2 shows an exemplary nozzle 110 that is fastenable to the reservoir 108 or to the printhead 102 via the reservoir 108. As shown in FIG. 2, the nozzle 110 has a nozzle opening 111 formed in the shape of a through hole through a nozzle plate 115. The nozzle plate can be made, for example, of graphite. It will be understood that other materials, for example various metals or alloys thereof, also can be used. In the shown example, the nozzle plate 115 is configured substantially circular-shaped, but it will be understood that the shape of the nozzle plate 115 is not limited thereto and it can have any other shapes.

The nozzle opening 111 is surrounded by a plastically deformable sealing material 117 for sealing against the reservoir 108. In particular, the sealing material 117 is a plastically deformable seal of, for example, the brand SIG-RAFLEX®. The sealing material 117 is high temperature resistant and, in some embodiments, can protrude from the nozzle plate 115 by a predetermined amount, such as 100 to 200 microns. In some embodiments, the sealing material 117 can be composed of multiple layers, for example from graphite.

During an operation, the nozzle 110 is detachably fastened to the printhead 102 at a first mounting position relative to the base 106. In this regard, as shown in FIG. 1, fastening to the printhead 102 at the first mounting position denotes, in particular, fastening of the nozzle 110 to the base 106 of the printhead 102 via the reservoir 108. In this way, the nozzle 110 has a predetermined positional relationship relative to the base 106, which corresponds to the first mounting position. It will thus be understood that the relative positional relationship between the base 106 and the nozzle 110 can be defined in a suitable way using suitable reference points, for example, on the base 106. For example, the first mounting position can be defined by a distance (spacing) along the longitudinal axis of the piston 130 from the underside of the base 106 and a predetermined position in the plane perpendicular thereto (for example, on the longitudinal axis).

When attaching the nozzle 110 using the fastening element 119, for example a clamping nut, the sealing material 117 is plastically deformed, and thereby ensures the desired sealing with respect to the reservoir 108 or the not-shown guide sleeve thereof. In particular, in embodiments in which the sealing material 117 is built up from (composed of) multiple deposits of thin layers, melt can diffuse into the sealing material 117 in the transition region so that a barrier is formed. This prevents leakage of liquid melt, in particular even when an overpressure is applied. In this regard, the same sealing material 117 can additionally be provided on the other side of the reservoir 108 to seal the reservoir 108 with respect to an insulation plate 121 shown in FIG. 1.

During a manufacturing process, it might become necessary to exchange the nozzle 110. Therefore, in addition to the printhead 102, a device for additive manufacturing of a component disclosed herein includes a magazine 112 having multiple nozzles 110, which are each detachably fastenable to the printhead 102 in the first mounting position relative to the base 106. An example of such a magazine 112 is shown in FIG. 3.

Figure 3:
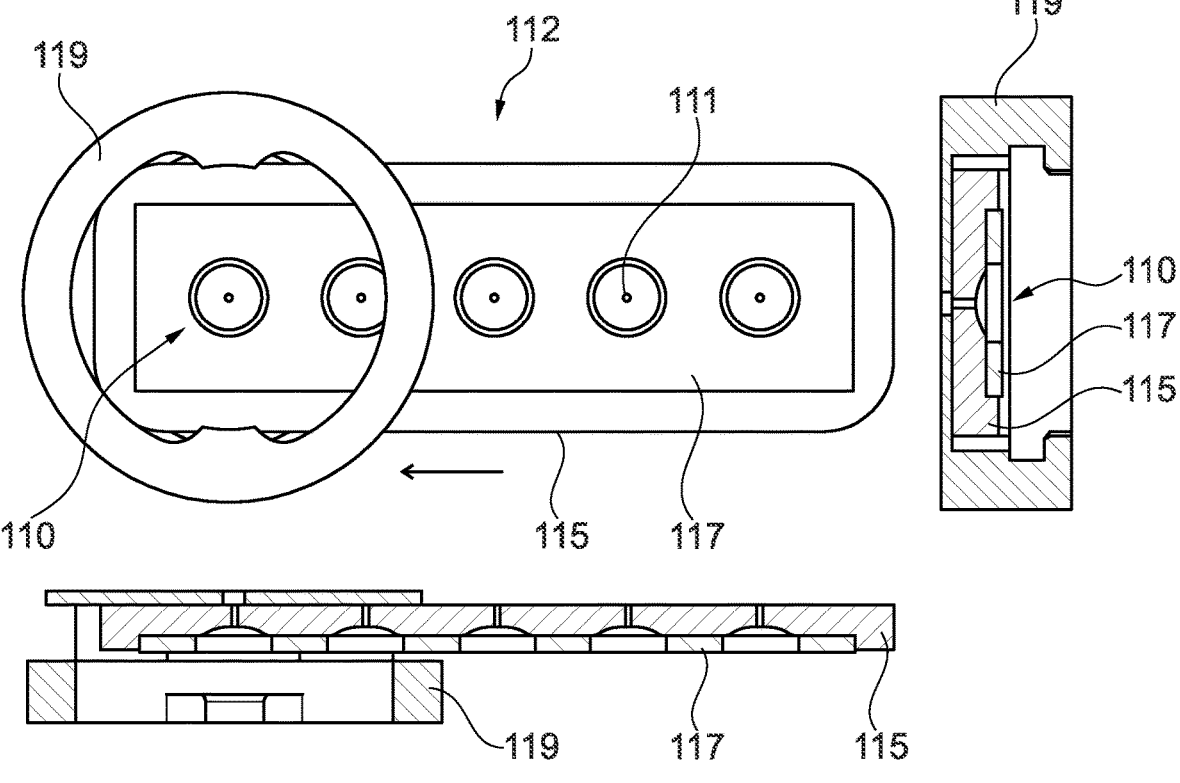
FIG. 3 shows a top view and two sectional views of a magazine having multiple nozzles according to the present disclosure.

As shown in FIG. 3, the magazine 112 includes a carrier having the plurality of nozzles 110, which is displaceably (slidably) mounted in the fastening element 119. In the embodiment shown in FIG. 3, the carrier is formed as an integrated nozzle plate 115 that forms (defines) the respective nozzle openings 111 of the plurality of nozzles 110. In other words, the carrier, which is displaceably mounted in the fastening element 119, is formed in the shape of a substantially rectangular nozzle plate 115 in which the multiple nozzle openings 111 are formed as through-holes that are arranged in a row. Preferably, the sealing material 117, which surrounds the respective nozzle openings 111, is provided as a single integral sealing element on the nozzle plate 115, as shown in FIG. 3. It is further apparent from FIG. 3 that, when the carrier or the nozzle plate 115 is displaced in the fastening element 119 in the direction indicated by the arrow in FIG. 3, a first one of the nozzle openings 111 or of the associated nozzles 110 can be moved from the position in the center of the fastening element 119 and at the same time a proximate nozzle opening 111 or a proximate nozzle 110 can be moved to that position. Thus, it is understood that, for the fastening element 119 fastened to the reservoir 108, a first nozzle 110 can be moved in this manner from the first mounting position and a new nozzle, which is contained in the magazine 112, can be moved to the first mounting position. To this end, at least one actuator 114, 124 (see FIG. 4), which is configured to be controlled by the controller 200 to move the printhead 102 and/or the magazine 112 relative to each other, is provided so that one of the multiple nozzles 110 is moved to the first mounting position.

For example, the at least one actuator 114, 124 (see FIG. 4) can be utilized to displace the right end of the carrier or the nozzle plate 115 shown in FIG. 3 by a predetermined amount in the leftward direction so that a new nozzle 110 is disposed at (moved to) the first mounting position. Alternatively, the at least one actuator 114, 124 can also be controlled to move the printhead 102 with the fastening element 119 fastened thereto so that the right end of the carrier 115 moves against a stop provided therefor and, upon further movement of the printhead in the direction of the stop, the new nozzle 110 is moved to the first mounting position 106. In both cases, however, an automated displacement of the carrier 115 and thus an automated changing of the nozzle 110 is possible without having to interrupt the process for a longer period of time. Thus, the nozzle can be changed even when the nozzle plate is at the temperature of the crucible and is, if applicable, located in an inert atmosphere. It is understood that the resistance, which must be overcome to displace the carrier, is set large enough that an undesired displacement during the manufacturing is precluded as much as possible.

For example, in some embodiments, the fastening element 119 can be loosened slightly prior to displacement of the carrier, in order to facilitate the displacement of the carrier. Following the displacement, the fastening element 119 is then tightened again.

In the above example, even though the magazine 112 includes the integral nozzle plate 115 having the integral sealing element 117, it is understood that the present invention is not limited thereto. Thus, for example, a suitable carrier, which can receive individual nozzles 110 in corresponding receptacles (for example, recesses), each as shown in FIG. 2, could be used. In this regard, the carrier need not be composed of the same material as the nozzle plate 115. Furthermore, it is understood that the substantially rectangular shape of the carrier 115 is also not limited thereto and suitable shapes, for example circular arc segments and the like, can be used as long as a displacement or a shifting of the carrier in the correspondingly formed fastening element 119 is possible in the manner described above.

As was mentioned above, it can also be necessary or desirable to change (replace) the reservoir 108 with the nozzle 110 during the manufacturing process. This will be explained in more detail below with reference to FIG. 4.

Figure 4:
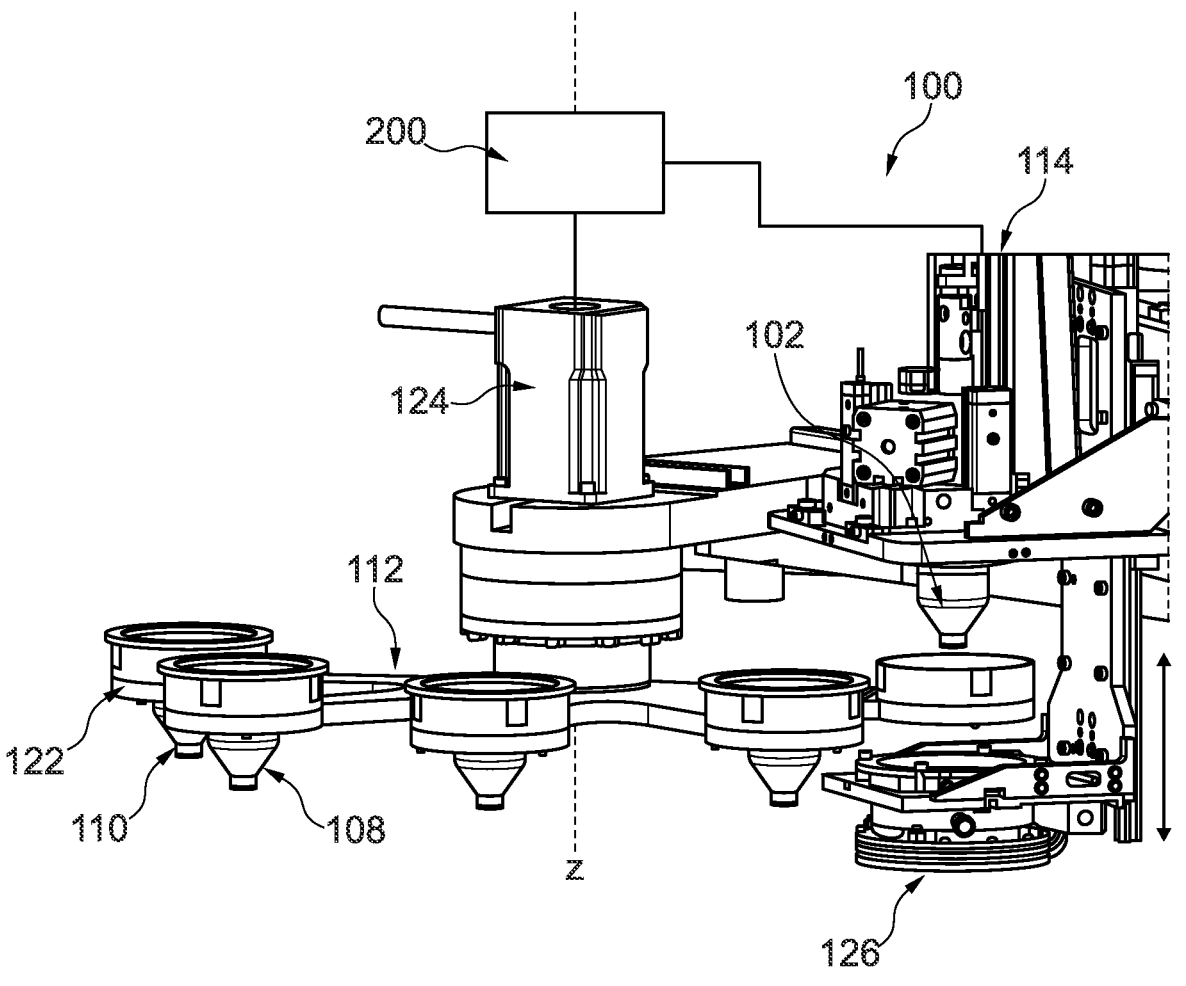
FIG. 4 shows a view of an exemplary device for carrying out a crucible change during a process.

As shown in FIG. 4, in some embodiments, the magazine 112 can include a plurality of receptacles 122 that are each configured to receive one reservoir 108, which is detachably fastenable to the base 106 in a second mounting position relative to the base 106 of the printhead 102. In the example shown in FIG. 4, the respective receptacles 122 are formed as hollow cylinders, in each of which one reservoir 108 can be received from above. Here, it is also understood that the term "second mounting position" is to be construed broadly and merely indicates that there is a predetermined positional relationship between the reservoir 108 attached to the base 106 and the base 106 which may be suitably defined, for example, by reference points on the base 106. It is further understood that, when the reservoir 108 is attached to the base 106 at the second mounting position, the nozzle 110 attached to the reservoir 108 is thereby preferably also at the first mounting position. This means that the reservoirs 108, which are received in the respective receptacles 122, preferably each have the nozzles 110 that are attached to the respective reservoirs so that one nozzle opening thereof is in fluid communication with the outlet opening 109 of the reservoir 108. Accordingly, the magazine 112 shown in FIG. 4 can also be construed as a magazine that has multiple nozzles 110, which are each detachably fastenable to the printhead 102 in (at) a first mounting position relative to the base 106 (namely, via the fastening of the reservoir 108). The at least one actuator is thereby also controlled so that one of the multiple nozzles (with the associated reservoir 108) is moved to the first mounting position. Thus, in addition to facilitating an exchange of the reservoir 108, the embodiment shown in FIG. 4 also has the effect of exchanging the nozzle 110 that was described with reference to FIG. 3.

An exchange of the reservoir 108 will be discussed in more detail below. In particular, the controller 200 of the device 100 shown in FIG. 4 is configured to control the at least one actuator 114, 124 such that a first, empty receptacle 122 is disposed at a position adjacent to and at a predetermined distance from a first reservoir 108 that is fastened to the base 106. For example, with the device 100 shown in FIG. 4, in which the multiple receptacles 122 are provided on multiple arms that extend in a radial direction and can be pivoted about a pivot axis Z, rotation about the pivot axis Z can be effected by an actuator 124 so that an empty receptacle 122 is positioned below the reservoir 108 that is attached to the printhead 102.

Then, the at least one actuator 114, 124 is controlled so that a relative movement between the fastened reservoir 108 and its receptacle 122 takes place in the Z-direction so that the fastened first reservoir is located in the first receptacle 122. For example, the actuator 114 can lower the printhead 102 (if applicable, together with the magazine 112 attached thereto) in the Z-direction until the reservoir 108 is set in the receptacle 122. Then, the fastening of the first reservoir 108 can be released in a suitable manner, and the released first reservoir 108, which is received in the first receptacle 122, can be moved from the second mounting position to a position different therefrom. It is understood that normally the piston 130 (see FIG. 1) projects from the base 106. This means that a movement of the released reservoir together with its receptacle away from the base 106 is normally required, in order to carry out a new pivot about the pivot axis Z. Subsequently, a second receptacle 122 having a (new) second reservoir 108 received therein can then be moved such that the second reservoir 108 is brought to the second mounting position. It is understood that, in addition to a pivoting movement, a movement in the Z direction towards the base 106 can again be required. Finally, the second reservoir can then be fastened to the base 106 in a suitable manner. As was mentioned above, since the reservoir 108 is normally already provided with a nozzle 110 or, in some circumstances, with a nozzle magazine shown in FIG. 3, this can also be construed as a nozzle change.

It is understood that, in order to carry out the above-described exchanging of the reservoir 108 in a prior step, the other components of the printhead 102 surrounding the reservoir 108 must first be removed therefrom. For example, the end pot 126 shown in FIG. 4, which has a heater, inert gas guide, etc., must be moved downward in order to expose the reservoir 108.

With the system described above, the entire exchanging (replacement) process can be carried out without lengthy cooling phases of the individual subcomponents. After a cooling, the used reservoirs can be removed from the crucible changer and cleaned already during the ongoing printing process or at the end of it.

In embodiments in which different materials are to be processed (printed) during the manufacturing, an exchanging of the piston 130 is normally required in addition to the above-described exchanging of the reservoir 108. In particular in embodiments in which a piezoactuator is used as the actuator 132 (see FIG. 1), since the piston 130 must be preloaded with a defined force with respect to the piezoactuator to generate droplets, the system must first be depressurized to release the piston 130, which is explained in more detail below.

Figure 5:
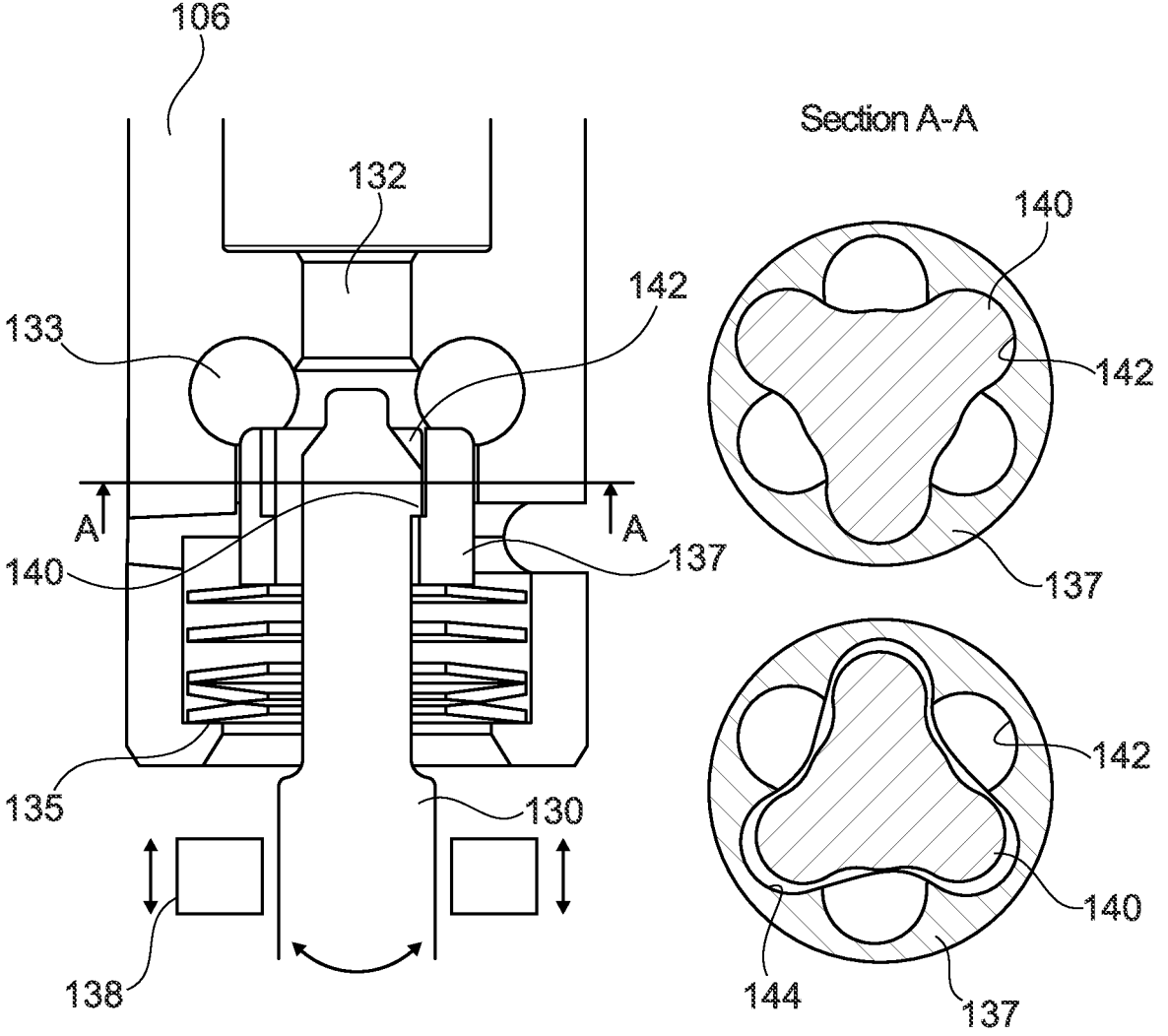
FIG. 5 shows a schematic view of a portion of a printhead and two associated sectional views.

FIG. 5 shows, on the left side, a schematic view of an upper end of piston 130 that is supported on the base 106. In particular, the upper end of the piston 130 is held by a retaining member 137 that is biased with the piston 130 against the base 106. Thus, a suitable biasing element, for example a spring 135, is supported on the base 106 and biases the retaining component 137, in which the upper end of the piston 130 is received, towards the base 106 (upwards), for example against a sleeve of the actuator 132 (not shown) that is detachably connected to the base 106. The actuator 132, for example a piezoactuator, is provided, for example, in the base 106 so that its lower end substantially abuts on the upper end of the piston 130. Therefore, upon actuation of the actuator 132, the piston 130 and the retaining component 137 are moved together downwardly toward the outlet opening 109.

To remove (extract) the piston using a piston engagement device 138 that is provided in a suitable manner around or at the piston 130, the piston 130 must first be separated from the actuator 132. For this purpose, a separating apparatus 133 is provided in the form of, for example, insertion openings in the base 106. Using the separating apparatus 133, the retaining component 137 can be moved (pushed) away from the base 106 against the biasing force of the spring 135 by inserting a suitable tool. To automatically remove and reinsert the piston 130, the controller 200 can be configured to control the piston engagement device 138 (for example, a conventional gripping element or the like) to grasp and remove the grasped piston 130 from the retaining component 137 when the retaining component 137 moves away from the base 106.

In one embodiment, the upper end of the piston 130 has at least one radially projecting overhang 140 that is received in a corresponding guide groove 142 of the retaining component 137 and limits movement of the piston 130 in the longitudinal direction thereof as well as in the circumferential direction. The guide groove 142 is thus not continuous in the Z-direction, but rather the lower end thereof forms a stop. This is shown on the right side in FIG. 5 in the two sectional views along line A-A. In the example shown in FIG. 5, three overhangs 140 are provided. The upper portion of the right side of the illustration thus shows the state in which the overhangs 140 are received in the corresponding guide grooves 142, so that no movement of the piston in the circumferential direction or downward is possible.

However, after the retaining component 137 with the piston 130 has been released using the separating apparatus 133, the piston 130 can be moved in the direction of the base 106 using the piston engagement device 138 and rotated about the longitudinal axis thereof by a predetermined angle, for example 60°, whereby the radially projecting overhangs 140 are aligned with corresponding extraction grooves 144 in the holding component 137. Thus, unlike the guide grooves 142, the extraction grooves 144 are formed (extend) through the entire retaining component 137 so that the appropriately positioned piston 130 can be removed (extracted) downwardly from the retaining component 137 and the base 106.

It is understood that the separating apparatus 133 shown in FIG. 5 in the form of the insertion openings is merely exemplary, and any other mechanisms can be used to override the biasing of the spring 135 and facilitate the movement of the piston 130 in the direction of the actuator 132, in order to facilitate the automated piston change.

It is further understood that the above-explained piston change is particularly advantageous when the changing of reservoir 108 described in connection with FIG. 4 is carried out.

Overall, in the above-described devices and/or methods, a changing of all components of the printhead 102, which on the one hand are subject to wear and on the other hand facilitate a more flexible production using, for example, different materials and the like, is facilitated during the process. Thus, overall efficiency of the manufacturing or the manufacturing process can be increased, since an exchange of parts can be carried out without having to stop the manufacturing, cool all components of the printhead 102, and the like.

It is explicitly emphasized that all features disclosed in the description and/or claims are to be considered separate and independent from each other for the purpose of the original disclosure as well as for the purpose of limiting the claimed invention regardless of the combinations of features in the embodiments and/or claims. It is explicitly stated that all range indications or indications of groups of units disclose any possible intermediate value or subgroup of units for the purpose of the original disclosure as well as for the purpose of limiting the claimed invention, in particular also as a limit of a range indication.

The invention claimed is:

1. A device for additive manufacturing of a component, including:
   a printhead configured to apply a liquid material, wherein the printhead includes a base;
   a controller configured to control the printhead to apply the liquid material;
   a magazine having multiple nozzles, which are each detachably fastenable to the printhead in a first mounting position relative to the base;
   a first reservoir configured to contain the liquid material, the first reservoir being fastenable to the base in a second mounting position relative to the base;
   a piston attached to the base and configured to eject the liquid material out of an outlet opening defined in the first reservoir;

a retaining member movably mounted on the base and having an upper end that holds the piston, the retaining member being biased with the piston against the base;

a separating apparatus configured to move the retaining member in a direction opposite of the biasing;

a piston engagement device configured to engage with the piston when the first reservoir is released; and at least one actuator configured to be controlled by the controller to move the printhead and/or the magazine relative to each other so that one of the multiple nozzles is moved to the first mounting position;

wherein the controller is configured to control the piston engagement device to grasp and remove the piston from the retaining member when the retaining member moves away from the base.

2. The device according to claim 1, wherein:

the magazine further includes a nozzle plate defining nozzle openings of the multiple nozzles, and a plastically deformable sealing material that surrounds the nozzle openings and is configured to seal against the first reservoir, and each of the multiple nozzles is detachably fastenable to the first reservoir in the first mounting position so that the one of nozzle openings of the one of the nozzles that is fastened to the first reservoir is in fluid communication with the outlet opening defined in the first reservoir.

3. The device according to claim 2, wherein the sealing material is composed of multiple layers, and/or protrudes by 100 to 200 μm above the nozzle plate.

4. The device according to claim 2, further comprising a fastening member, configured to fasten the magazine to the first reservoir, wherein the magazine further includes a carrier having the nozzle plate with the multiple nozzles, the carrier being displaceably mounted in the fastening element.

5. The device according to claim 4, wherein the nozzle plate of the carrier is an integral nozzle plate that defines respective nozzle openings of the multiple nozzles.

6. The device according to claim 4, wherein the controller is configured to control the at least one actuator such that the at least one actuator directly or indirectly displaces the carrier in the fastening element to move a first one of the multiple nozzles away from the first mounting position and to move a second one of the multiple nozzles to the first mounting position.

7. The device according to claim 1, wherein the magazine includes at least first and second receptacles that are each configured to respectively receive the first reservoir and a second reservoir, and wherein the multiple nozzles are each provided on one of the first or second reservoir received in one of the first or second receptacles so that a nozzle opening of the one of the multiple nozzles fastened to the first or second reservoir is in fluid communication with the outlet opening defined in the reservoir.

8. The device according to claim 7, wherein the controller is configured to control the at least one actuator to:

move the first receptacle, which is empty, to a position adjacent to and at a predetermined distance from the first reservoir that is fastened to the base, move the fastened first reservoir and the first receptacle relative to each other so that the fastened first reservoir is located in the first receptacle, release the fastening of the first reservoir, move the first reservoir received in the first receptacle to a position different from the second mounting position, move the second receptacle having the second reservoir received therein such that the second reservoir is disposed at the second mounting position, and fasten the second reservoir to the base.

9. The device according to claim 7, wherein:

the at least first and second receptacles are disposed so as to be pivotable about a pivot axis, and a first actuator is configured to pivot the at least first and second receptacles about the pivot axis.

10. The device according to claim 8, further including a cover that is fastenable to the base for covering and heating the first or the second reservoir fastened at the second mounting position, wherein a third actuator is configured to move the cover away from the base to expose the first or the second reservoir.

11. The device according to claim 8, wherein the first reservoir and the second reservoir differ with respect to at least one of the liquid material contained therein or of a diameter of the nozzle opening of the associated nozzle.

12. The device according to claim 1, wherein the upper end of the piston includes at least one radially projecting overhang that is received in a corresponding guide groove of the retaining member and limits movement of the piston in a longitudinal direction thereof, wherein the controller is configured to control the piston engagement device to rotate the piston about the longitudinal axis thereof by a predetermined angle, and to move the rotated piston away from the base to remove the piston from the retaining member.

13. The device according to claim 1, wherein the separating apparatus includes at least one insertion opening formed in the base and is configured such that a separating device is insertable through the at least one insertion opening between the base and the retaining member to separate them from each other.

14. The device according to claim 4, wherein the fastening member includes a clamping nut.

15. The device according to claim 14, wherein:

the nozzle plate is an integral nozzle plate that defines respective nozzle openings of the multiple nozzles, and the sealing material is provided on the nozzle plate as a single integral sealing element that surrounds each of the respective nozzle openings.

16. The device according to claim 15, wherein the controller is configured to control the at least one actuator such that the at least one actuator directly or indirectly displaces the carrier in the fastening element to move a first one of the multiple nozzles away from the first mounting position and to simultaneously move a second one of the multiple nozzles to the first mounting position.

17. The device according to claim 9, further including a second actuator configured to move the at least first and second receptacles in a direction along the pivot axis.

18. The device according to claim 17, further including:

a cover that is fastenable to the base for covering and heating the first or the second reservoir fastened at the second mounting position, and a third actuator configured to move the cover away from the base to expose the first or the second reservoir.

19. The device according to claim 18, wherein the first reservoir differs from the second reservoir with respect to the liquid material contained therein or with respect to a diameter of the nozzle opening of the associated nozzle.

* * * * *